(12) United States Patent
Maruyama et al.

(10) Patent No.: US 11,906,428 B2
(45) Date of Patent: Feb. 20, 2024

(54) SPECTROFLUOROPHOTOMETER, SPECTROFLUORO-MEASUREMENT METHOD, AND IMAGE CAPTURING METHOD

(71) Applicant: HITACHI HIGH-TECH SCIENCE CORPORATION, Tokyo (JP)

(72) Inventors: Kai Maruyama, Tokyo (JP); Jun Horigome, Tokyo (JP); Hideyuki Sakamoto, Tokyo (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 44 days.

(21) Appl. No.: 17/548,243

(22) Filed: Dec. 10, 2021

(65) Prior Publication Data

US 2022/0205918 A1 Jun. 30, 2022

(30) Foreign Application Priority Data

Dec. 25, 2020 (JP) .................................. 2020-217723

(51) Int. Cl.
*G01N 21/64* (2006.01)
(52) U.S. Cl.
CPC . *G01N 21/6456* (2013.01); *G01N 2021/6463* (2013.01)
(58) Field of Classification Search
CPC ....... G01N 21/6456; G01N 2021/6463; G01N 2021/6417; G01N 21/645; G01J 3/10; G01J 3/18; G01J 3/4406
See application file for complete search history.

(56) References Cited

U.S. PATENT DOCUMENTS

| 9,784,670 | B1* | 10/2017 | Mohan | G02B 5/1814 |
| 2018/0120221 | A1* | 5/2018 | Mohan | G02B 5/1814 |
| 2019/0025208 | A1* | 1/2019 | Horigome | G01J 3/0254 |
| 2019/0025209 | A1* | 1/2019 | Horigome | G01N 21/31 |
| 2020/0292453 | A1* | 9/2020 | Horigome | G01J 3/4406 |
| 2021/0140876 | A1* | 5/2021 | Mohan | G01N 21/76 |

FOREIGN PATENT DOCUMENTS

| JP | 2006258538 A | 9/2006 |
| JP | 2019020362 A | 2/2019 |

\* cited by examiner

*Primary Examiner* — David P Porta
*Assistant Examiner* — Gisselle M Gutierrez
(74) *Attorney, Agent, or Firm* — Holland & Hart LLP

(57) ABSTRACT

Provided is a spectrofluorophotometer acquiring both a spectrum and a sample image in measurement of fluorescence of a liquid sample.
A spectrofluorophotometer includes a light source, an excitation-side spectroscope that performs spectral dispersion of light of the light source and generates excitation light, a fluorescence-side spectroscope that performs spectral dispersion of fluorescence emitted from a sample irradiated with excitation light into monochromatic light, a sample container installation portion for holding a sample container which receives a liquid sample and is formed of a transparent material, a detector that detects fluorescence emitted from the liquid sample, and an image capturing device that captures a sample image of a sample emitting fluorescence. The sample container installation portion includes a port for allowing excitation light to pass therethrough, a port for allowing fluorescence emitted from a sample to pass therethrough, and a port for allowing the image capturing device to observe a sample.

5 Claims, 18 Drawing Sheets

SPECTROFLUOROPHOTOMETER, SPECTROFLUORO-MEASUREMENT METHOD, AND IMAGE CAPTURING METHOD

CROSS REFERENCE TO RELATED APPLICATION(S)

This application claims the benefit of Japanese Patent Application No. 2020-217723, filed Dec. 25, 2020, which is hereby incorporated by reference in its entirety into this application.

1. TECHNICAL FIELD

The present invention relates to a spectrofluorophotometer, a spectrofluoro-measurement method, and an image capturing method.

2. DESCRIPTION OF THE RELATED ART

A spectrofluorophotometer is a device for analyzing substances included in various samples by irradiating the samples with excitation light and measuring fluorescence generated from the samples. That is, in a spectrofluorophotometer, a sample is irradiated with excitation light, fluorescence emitted from the sample is spectrally dispersed, and spectrum data such as an excitation spectrum, a fluorescence spectrum, change over time, and a three-dimensional fluorescence spectrum is acquired. An area according to optics (generally within a range of approximately 1 to 2 $cm^2$) is irradiated with excitation light, and emitted fluorescence is detected at that spot.

Patent Literature 1 discloses a spectrofluorophotometer in which an integrating sphere and an image capturing device are mounted in the spectrofluorophotometer and measurement of a spectrum of a sample and image capturing are performed at the same time.

Patent Literature 2 discloses a method of observing a sample from a lateral side of the sample held on a flat surface substrate using an image capturing device regarding a spectrophotometer measuring an absorbance of a droplet sample.

DOCUMENT OF RELATED ART (Patent Document 1) Japanese Unexamined Patent Application Publication No. 2019-020362
(Patent Document 2) Japanese Unexamined Patent Application Publication No. 2006-258538

SUMMARY OF THE INVENTION

In the related art, in general spectrofluorophotometers, a fluorescence spectrum at the time of irradiation with excitation light or variation in fluorescence intensity when a wavelength of excitation light is varied are acquired as an excitation spectrum. At this time, since there is a need for a sample chamber for installing a sample to become a darkroom, it is difficult to check a state such as luminescent color and a luminescent intensity of fluorescence of a sample at the time of irradiation with excitation light.

In the spectrofluorophotometer disclosed in Patent Literature 1, since an image of a sample during measurement of a spectrum is captured and a distribution of an in-plane luminescent state is observed, it is possible to acquire an image of a sample when irradiation is performed with an arbitrary excitation wavelength. In the disclosed device, an integrating sphere and an image capturing device are mounted, and a sample is installed in the vicinity of an opening portion of the integrating sphere. Generally, an inner surface of an integrating sphere is coated with a white material having a high reflectance, such as barium sulfate. In the case of a liquid sample, if a sample is installed in the vicinity of an opening portion of an integrating sphere, there is concern of the inner surface of the integrating sphere being contaminated by the sample. Therefore, it cannot be said that it is suitable for application to a liquid sample. In addition, if an integrating sphere is used, excitation light with which a sample has been irradiated and fluorescence which has been emitted from the sample are subjected to irradiation of the sample after repeating reflection or diffusion within an inner surface of the integrating sphere or detected by a detector. Therefore, the quantities of the excitation light for irradiating the sample and the fluorescence detected by the detector become relatively small.

In the spectrophotometer disclosed in Patent Literature 2, a sample in a droplet state is held on a sample holding plate, and observation is performed using an image capturing device from a lateral side of the sample. When this constitution is applied to a spectrofluorophotometer, a luminescent direction or the like of fluorescence emitted from a droplet sample varies due to an installation state of the sample or a size of a droplet, and thus there is a possibility that accurate measurement will not be able to be performed.

The present invention has been made in order to resolve the foregoing problems, and an object thereof is to provide a spectrofluorophotometer capable of easily performing measurement of a spectrum and image capturing at the same time in measurement of a liquid sample without requiring any complicated optics.

Solution to Problem

A spectrofluorophotometer of the present invention includes a light source, an excitation-side spectroscope that performs spectral dispersion from light of the light source and generates excitation light, a fluorescence-side spectroscope that performs spectral dispersion of fluorescence emitted from a sample irradiated with the excitation light into monochromatic light, a sample container installation portion for holding a sample container which receives a liquid sample and is formed of a transparent material, a detector that detects fluorescence emitted from the liquid sample, and an image capturing device that captures a sample image of the liquid sample emitting fluorescence.

The sample container installation portion has ports in an excitation light incidence direction and a fluorescence taking-out direction and further includes a port in another direction for the image capturing device capturing the sample image.

In the present invention, for example, the image capturing device is provided at a position in a bottom surface direction of the sample container installation portion. The image capturing device captures the sample image by directly capturing fluorescence emitted from a sample in the bottom surface direction of the sample container installation portion.

A spectrofluoro-measurement method using a spectrofluorophotometer of the present invention is a spectrofluoro-measurement method using a spectrofluorophotometer including a light source, an excitation-side spectroscope that performs spectral dispersion from light of the light source and generates excitation light, a fluorescence-side spectroscope that performs spectral dispersion of fluorescence emitted from a sample irradiated with the excitation light into monochromatic light, a sample container installation portion for holding a sample container which receives a liquid sample and is formed of a transparent material, a detector that detects fluorescence emitted from the liquid sample, and an image capturing device that captures a sample image of the liquid sample emitting fluorescence. The spectrofluoro-measurement method includes causing excitation light to be incident through a port provided in an excitation light incidence direction of the sample container installation portion, causing the detector to detect fluorescence through a port provided in a fluorescence emission direction of the sample container installation portion, and causing the image capturing device to capture the sample image via a port provided in another direction of the sample container installation portion.

An image capturing method using a spectrofluorophotometer of the present invention includes irradiating a sample with excitation light, blocking excitation light after fluorescence and phosphorescence are emitted from the sample, detecting only phosphorescence emitted from the sample after excitation light is blocked, and capturing a sample image in synchronization with a detection timing of phosphorescence.

Advantageous Effects of Invention

According to the present invention, it is possible to acquire a sample image and a spectrum of a liquid sample at the same time with a simple constitution.

BRIEF DESCRIPTION OF THE DRAWINGS

FIG. 11(a) illustrates a timing chart of excitation light, FIG. 11(b) illustrates a timing chart of fluorescence and phosphorescence, FIG. 11(c) illustrates a timing chart of detection by a detector, and FIG. 11(d) illustrates a timing chart of exposure by the camera module.

DESCRIPTION OF THE PREFERRED EMBODIMENTS

Hereinafter, a preferable embodiment of a spectrofluorophotometer according to the present invention will be described on the basis of FIGS. 1 to 11.

Figure 1:
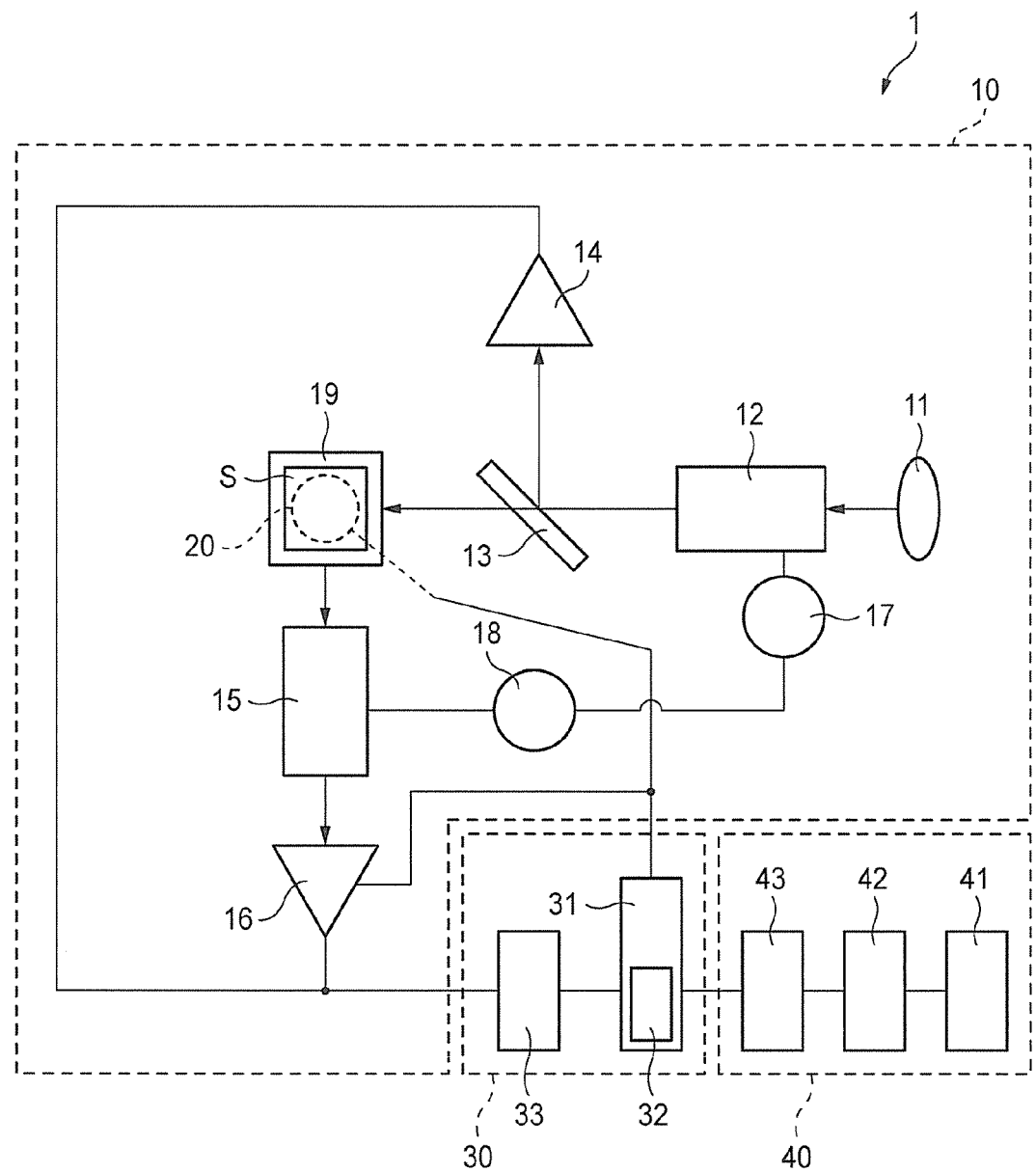
FIG. 1 is a block diagram illustrating an embodiment of a spectrofluorophotometer according to the present invention.

FIG. 1 is a block diagram of a constitution illustrating the embodiment of the spectrofluorophotometer according to the present invention. A constitution of the spectrofluorophotometer of the present embodiment will be described using FIG. 1.

A spectrofluorophotometer 1 of the present embodiment is a device that irradiates a sample with excitation light and measures fluorescence emitted from a sample, and includes a photometer portion 10; a data processing portion 30 which is disposed inside the photometer portion 10, controls the photometer portion 10, and analyzes a sample; and an operation portion 40 which performs inputting and outputting.

The photometer portion 10 includes a light source 11 which emits continuous light, an excitation-side spectroscope 12 which performs spectral dispersion from light of the light source 11 and generates excitation light, a beam splitter 13 which performs spectral dispersion of light from the excitation-side spectroscope 12, a monitor detector 14 which measures an intensity of a part of light which has been spectrally dispersed by the beam splitter 13, a fluorescence-side spectroscope 15 which performs spectral dispersion of fluorescence emitted from a sample into monochromatic light, a detector (fluorescence detector) 16 which detects fluorescence emitted from a liquid sample as an electrical signal of monochromatic fluorescence, an excitation-side pulse motor 17 which drives a diffraction grating of the excitation-side spectroscope 12, a fluorescence-side pulse motor 18 which drives a diffraction grating of the fluorescence-side spectroscope 15, and a sample container installation portion 19 which receives and holds a sample (liquid sample) S that is an object to be measured.

The data processing portion 30 includes a computer 31, a controller 32 which is disposed inside the computer, and an analog-digital converter 33 which performs digital conversion of fluorescence from a sample. In addition, the operation portion 40 includes an operation panel 41 which inputs an input signal necessary for processing of the computer 31, a display portion 42 which displays various analysis results processed by the computer 31, and an interface 43 which connects the operation panel 41 and the display portion 42 to the computer 31.

In accordance with measurement conditions input by an operator using the operation panel 41, the computer 31 outputs a signal to the excitation-side pulse motor 17, the excitation-side pulse motor 17 is driven, and the excitation-side spectroscope 12 is set at a position having a target wavelength. In addition, in accordance with the measurement conditions in the same manner, the computer 31 outputs a signal to the fluorescence-side pulse motor 18, the fluorescence-side pulse motor 18 is driven, and the fluorescence-side spectroscope 15 is set at a position having a target wavelength. The excitation-side spectroscope 12 and the fluorescence-side spectroscope 15 have an optical element such as a diffraction grating or a prism having a predetermined slit width, use the excitation-side pulse motor 17 and the fluorescence-side pulse motor 18 for motive power, and cause the optical element to perform rotary motion via a driving system component such as a gear or a cam, thereby being able to perform spectrum scanning.

The sample S in a liquid state is dispensed in a square cell of 10 mm, for example, and is installed in the sample container installation portion 19. At this time, irradiation is performed with excitation light, and fluorescence generated on a lateral side in a right angle direction with respect to excitation light is measured.

Moreover, in the present embodiment, a camera module (image capturing device) 20 is provided in the vicinity of the sample container installation portion 19 (for example, a lower portion of the sample container installation portion 19). The camera module 20 is a device that detects an electrical signal of fluorescence from a sample and captures and acquires a sample image (an image of fluorescence emitted from a sample) of fluorescence from the sample S emitting fluorescence differently from the detector 16 acquiring an intensity of a spectrum. A general device capable of capturing a sample image can be used as the camera module 20.

Figure 2:
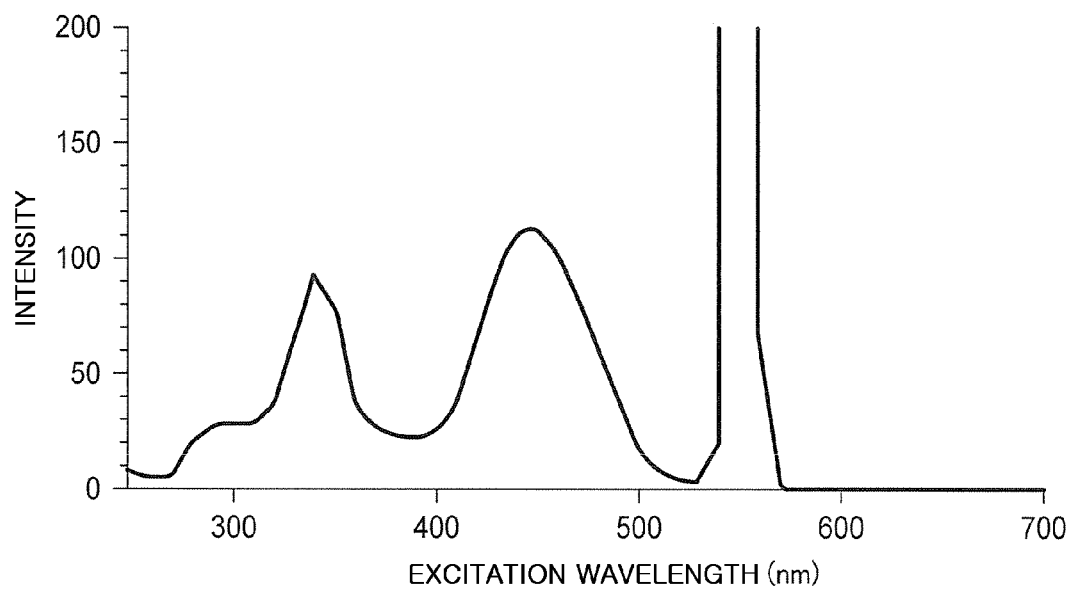
FIG. 2 is a view illustrating an excitation spectrum indicating an intensity of fluorescence with respect to an excitation wavelength in the spectrofluorophotometer.
Figure 3:
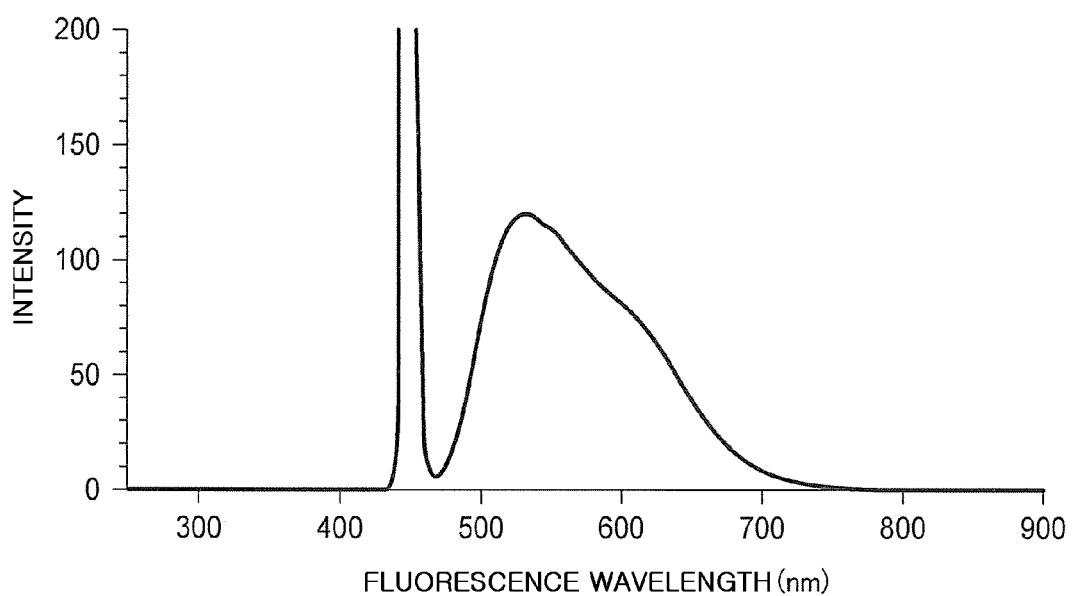
FIG. 3 is a view illustrating a fluorescence spectrum indicating an intensity of a fluorescence wavelength in measurement of the spectrofluorophotometer.
Figure 4:
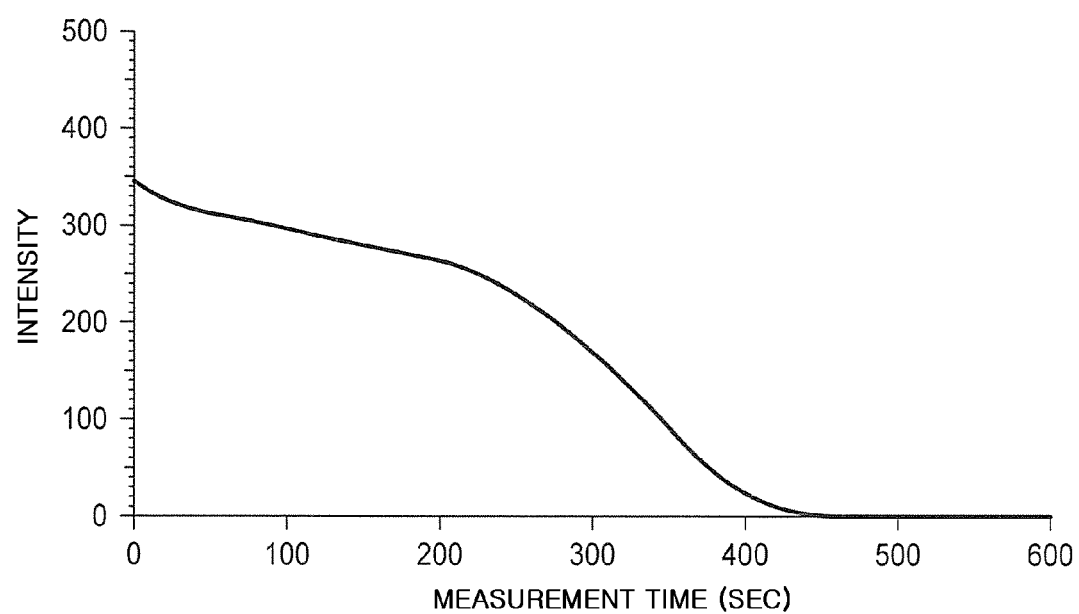
FIG. 4 is a view illustrating a change-over-time spectrum of an intensity of fluorescence having a particular wavelength corresponding to excitation light having a particular wavelength in the spectrofluorophotometer.
Figure 5A:
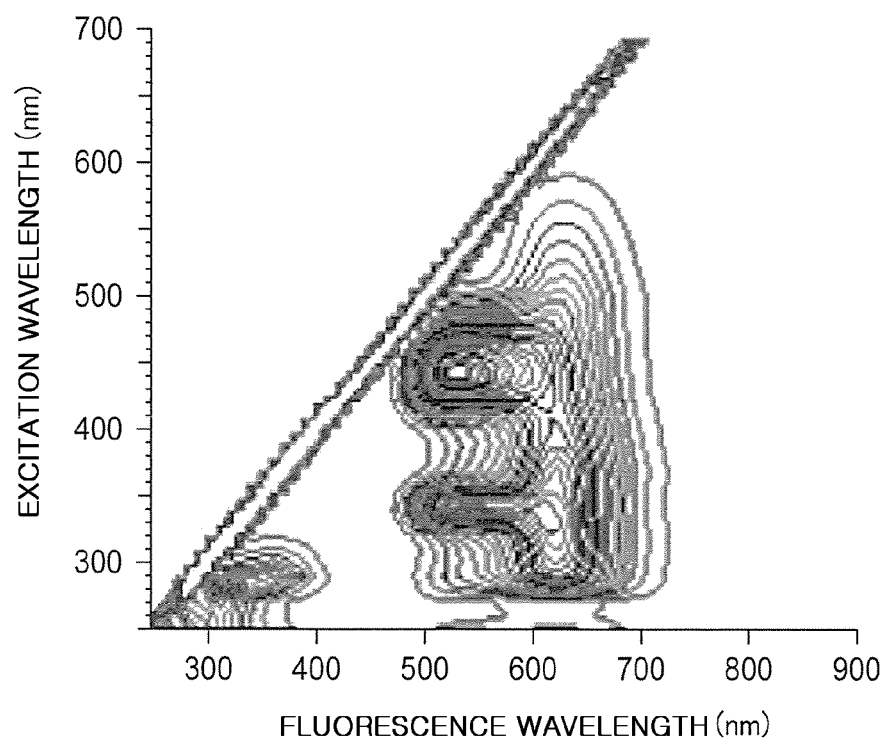
FIG. 5A is a view illustrating a three-dimensional spectrum and illustrates a three-dimensional fluorescence spectrum of an excitation wavelength, a fluorescence wavelength, and a fluorescence intensity.
Figure 5B:
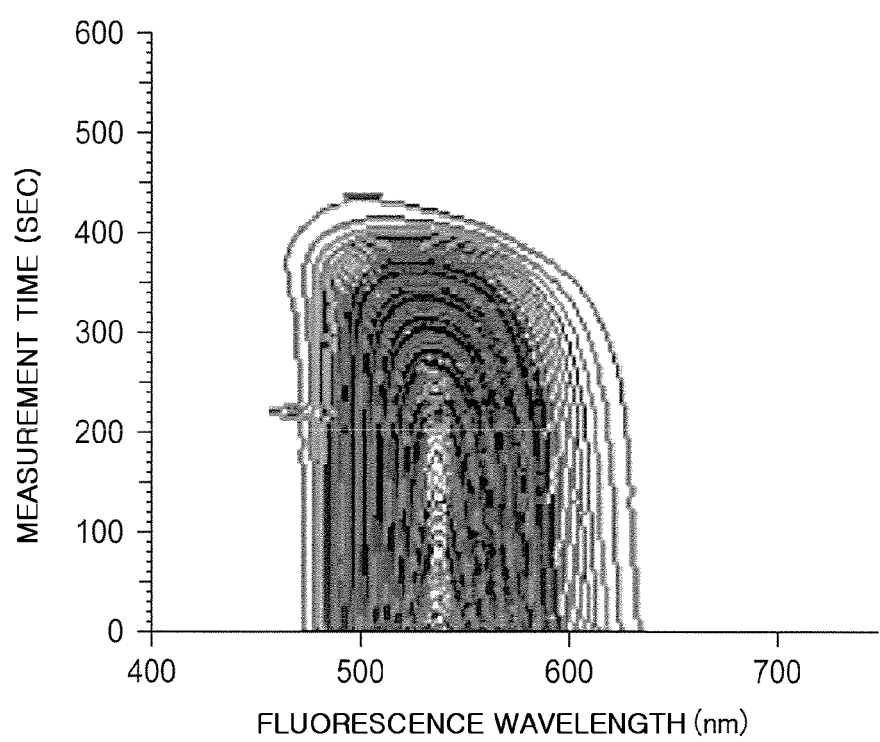
FIG. 5B is a view illustrating a three-dimensional spectrum and is a view illustrating a three-dimensional change-over-time spectrum of a time, a fluorescence wavelength, and a fluorescence intensity.

Generally, an electrical signal of fluorescence from the sample S obtained from the detector 16 is displayed by the display portion 42 in a form of various spectrums indicating the intensity of fluorescence. FIGS. 2 to 5 illustrate examples of a two-dimensional spectrum including two axes or a three-dimensional spectrum including three axes which can be obtained by not only the spectrofluorophotometer 1 of the present embodiment but also a general spectrofluorophotometer. FIG. 2 illustrates an excitation spectrum that is an example of a spectrum, FIG. 3 illustrates a fluorescence spectrum that is an example of a spectrum, FIG. 4 illustrates a change-over-time spectrum that is an example of a spectrum, and FIGS. 5A and 5B illustrate three-dimensional spectrums that are examples of spectrums.

The excitation spectrum illustrated in FIG. 2 is a spectrum obtained by measuring a fluorescence intensity when an excitation wavelength of excitation light is varied with respect to a sample. The excitation-side spectroscope 12 varies the excitation wavelength from a measurement starting wavelength to a measurement ending wavelength and irradiates a sample with excitation light having each wavelength. The detector 16 detects fluorescence having a particular wavelength through the fluorescence-side spectroscope 15 set to a fixed wavelength at that time, and the fluorescence is taken into the computer 31 as a signal intensity via the analog-digital converter 33. The computer 31 (controller 32) performs analysis processing of this signal intensity and generates a spectrum which can be displayed by the display portion 42.

As a measurement result, the display portion 42 displays a two-dimensional excitation spectrum having an excitation wavelength and a fluorescence wavelength as illustrated in FIG. 2. The spectrum (graph) in FIG. 2 illustrates a fluorescence intensity (arbitrary unit) when the excitation wavelength is varied with a particular fluorescence wavelength (for example, 550 nm).

The fluorescence spectrum illustrated in FIG. 3 is a spectrum obtained by irradiating a sample with excitation light having a fixed wavelength and measuring the fluorescence intensity for each wavelength when the fluorescence wavelength is varied. A sample is irradiated with excitation light from the excitation-side spectroscope 12 set to a fixed wavelength. The fluorescence-side spectroscope 15 varies fluorescence of an object to be measured at that time from the measurement starting wavelength to the measurement ending wavelength, the detector 16 detects the variation in fluorescence for each wavelength, and the variation is taken into the computer 31 as a signal intensity via the analog-digital converter 33. The computer 31 (controller 32) performs analysis processing of this signal intensity and generates a spectrum which can be displayed by the display portion 42.

As a measurement result, the display portion 42 displays a two-dimensional fluorescence spectrum having a fluorescence wavelength and a fluorescence intensity as illustrated in FIG. 3. The spectrum in FIG. 3 illustrates a fluorescence intensity when excitation light has a particular wavelength (for example, 450 nm) and the fluorescence wavelength is varied.

The change-over-time spectrum illustrated in FIG. 4 is a spectrum obtained by irradiating a sample with excitation light having a fixed wavelength and measuring the fluorescence intensity having a fixed wavelength for each unit time. A sample is irradiated with excitation light from the excitation-side spectroscope 12 set to a fixed wavelength, and the detector 16 detects variation in intensity of fluorescence for each time through the fluorescence-side spectroscope 15 in which fluorescence generated at that time is set to the fixed wavelength at that time. This is taken into the computer 31 as a signal intensity via the analog-digital converter 33.

As a measurement result, the display portion 42 displays a two-dimensional change-over-time spectrum having a measurement time and a fluorescence intensity as illustrated in FIG. 4. The spectrum in FIG. 4 illustrates a detection result of the intensity of fluorescence having a particular wavelength (for example, 550 nm) corresponding to excitation light having a particular wavelength. As time elapses, the intensity often decreases due to change, decomposition, or the like of fluorescent substances in a sample.

FIG. 5A illustrates a three-dimensional spectrum displayed by the display portion 42 and particularly illustrates a three-dimensional fluorescence spectrum. Regarding a sample, a fluorescence spectrum with a fixed excitation wavelength is measured. When fluorescence spectrum scanning ends, the fluorescence wavelength is returned to the measurement starting wavelength, and the excitation wavelength is driven at a predetermined wavelength interval. Then, the fluorescence spectrum with the next excitation wavelength is measured. The obtained fluorescence spectrum is stored in a three-dimensional manner with an excitation wavelength, a fluorescence wavelength, and a fluorescence intensity, and thus a three-dimensional fluorescence spectrum can be acquired by repeating driving until the excitation wavelength reaches the last wavelength. This spectrum can be a combination of the excitation spectrum in FIG. 2 and the fluorescence spectrum in FIG. 3.

The obtained three-dimensional fluorescence spectrum is depicted in a three-dimensional simulation form such as a contour diagram or an air view by connecting the same fluorescence intensities to each other with a line. The excitation wavelength and the fluorescence wavelength forming a mountain in a contour line become the excitation wavelength suitable for a sample and a characteristic fluorescence wavelength, and an operator can easily understand fluorescence characteristics having an excitation wavelength and a fluorescence wavelength within a measurement range of the sample. Such a three-dimensional fluorescence spectrum is useful in that much information such as the number of components or identification of the components of a fluorescent substance in a sample can be obtained.

FIG. 5B illustrates another three-dimensional spectrum displayed by the display portion 42 and particularly illustrates a three-dimensional change-over-time spectrum. Regarding a sample, a fluorescence spectrum with a fixed excitation wavelength is measured. When fluorescence spectrum scanning ends, the fluorescence wavelength is returned to the measurement starting wavelength, and the fluorescence spectrum with the same excitation wavelength is measured after a certain time. The obtained fluorescence spectrum is stored in a three-dimensional manner with a measurement time, a fluorescence wavelength, and a fluorescence intensity, and thus a three-dimensional change-over-time spectrum can be acquired by repeating driving until the measurement time reaches the set measurement time. This spectrum can be a combination of the fluorescence spectrum in FIG. 3 and the change-over-time spectrum in FIG. 4. The obtained three-dimensional change-over-time spectrum is depicted in a three-dimensional simulation form such as a contour diagram or an air view by connecting the same fluorescence intensities to each other with a line. Such a three-dimensional change-over-time spectrum is useful for obtaining change over time in the fluorescence spectrum.

In the present embodiment, the sample S (object to be measured) is irradiated with excitation light which has been spectrally dispersed by the beam splitter 13. At this time, a part of excitation light is transmitted through the sample S and moves forward. In order to observe fluorescence emitted from the sample S, it is desirable to avoid installation of the camera module 20 in the same direction as an excitation light irradiation direction in which the measurement sample S is irradiated. For example, a sample container is disposed at a position where it is observed in a lateral side direction or a bottom surface direction.

Emitted fluorescence is taken in by the fluorescence-side spectroscope 15 and is spectrally dispersed into monochromatic light. This monochromatic light is detected by the detector 16 and is taken into the computer 31 as a signal intensity through the analog-digital converter 33. Then, the display portion 42 displays various analysis results. On the other hand, the camera module 20 captures an image of fluorescence emitted in a different direction and acquires a sample image, and the sample image is displayed by the display portion 42.

Figure 6A:
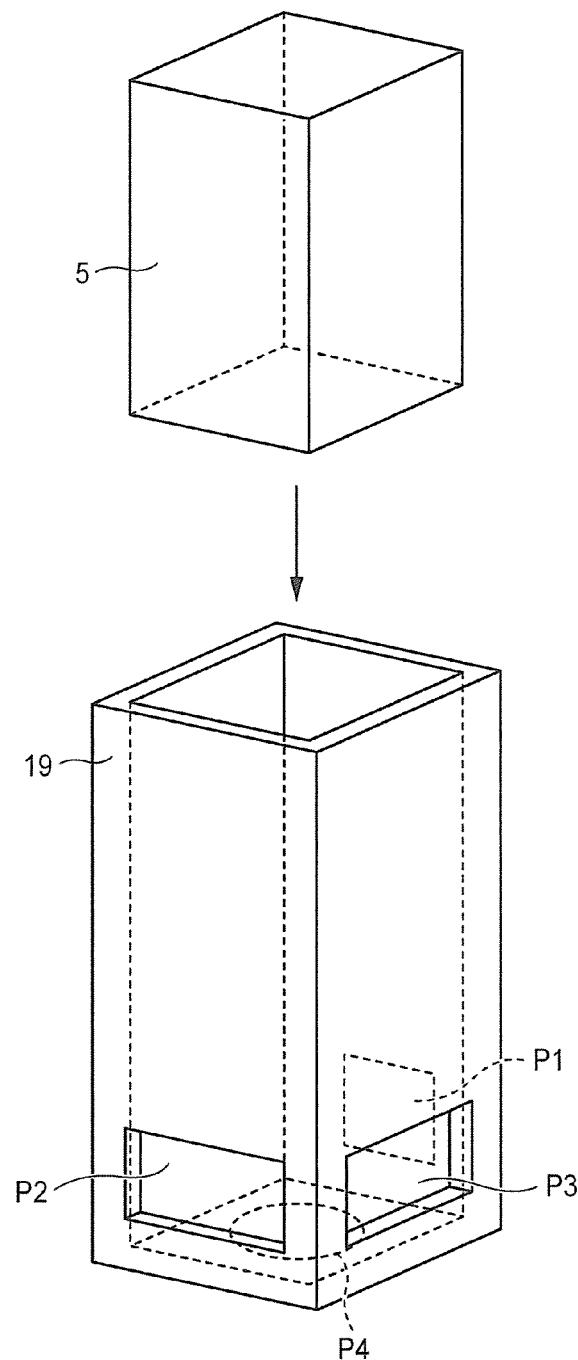
FIG. 6A is a schematic view illustrating a constitution of a sample container installation portion and illustrates a perspective view.
Figure 6B:
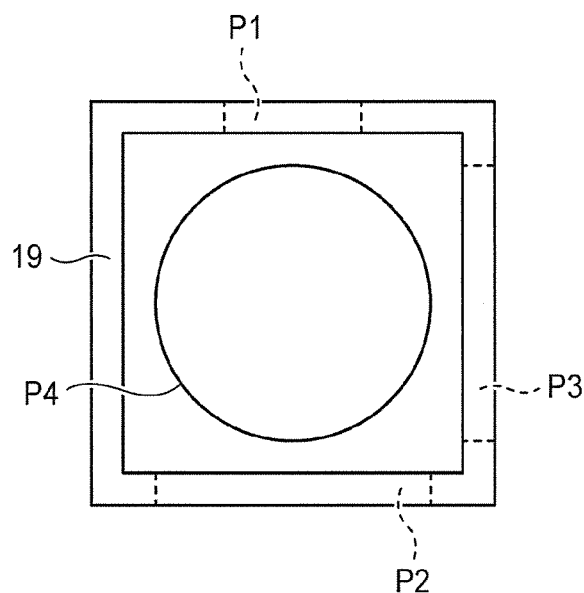
FIG. 6B is a schematic view illustrating a constitution of the sample container installation portion and illustrates a top view.
Figure 6C:
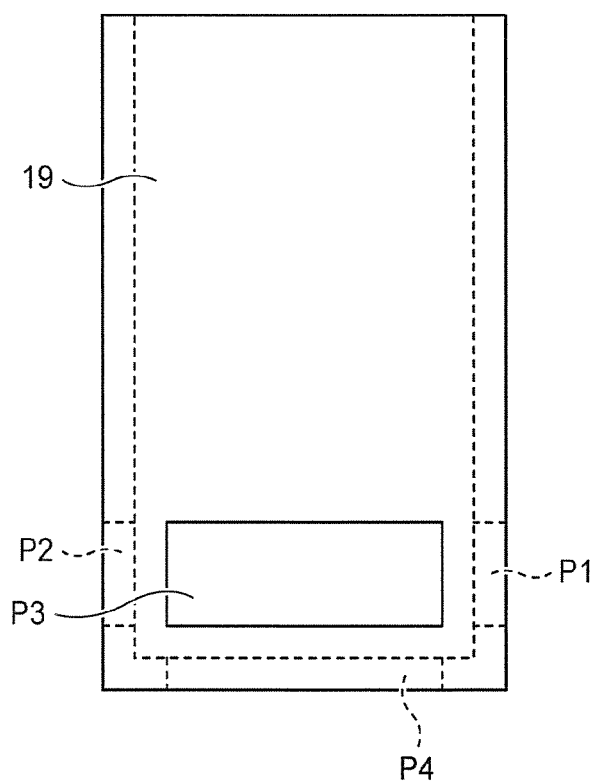
FIG. 6C is a schematic view illustrating a constitution of the sample container installation portion and illustrates a side view.

FIGS. 6A to 6E are views illustrating examples of constitutions of the sample container installation portion 19 which holds a square cell-like sample container 5 receiving a liquid sample. FIG. 6A illustrates a perspective view of the sample container installation portion 19, FIG. 6B illustrates a top view of the sample container installation portion 19, and FIG. 6C illustrates a side view in a fluorescence taking-in direction of the sample container installation portion 19 (a direction viewed from a port P3 side). The sample container installation portion 19 of the present example holds the square cell-like sample container 5 formed of a transparent material with five surfaces such as a bottom surface and side surfaces and is provided with four ports (holes) P1 to P4 penetrating outer surfaces and inner surfaces of the sample container installation portion 19. Parts excluding the ports P1 to P4 on respective surfaces of the sample container installation portion 19 are constituted of materials shielded from light.

The port P1 and the port P2 are provided on surfaces facing each other. In addition, the port P3 is provided on a lateral side of the port P1 and the port P2 at a predetermined angle (90 degrees in the present embodiment). The port P4 is provided on a bottom surface portion of the sample container installation portion 19. The port P1 at a position facing the beam splitter 13 transmits excitation light generated by the excitation-side spectroscope 12 and spectrally dispersed by the beam splitter 13 and controls an irradiation range of excitation light with respect to a sample in accordance with the shape thereof. The port P2 is provided at a position facing the port P1 and transmits excitation light which has been transmitted through a sample in a linear direction. The port P3 at a position facing the fluorescence-side spectroscope 15 and the port P4 provided on the bottom surface of the sample container installation portion 19 cantransmit fluorescence which has been emitted from a sample.

Figure 6D:
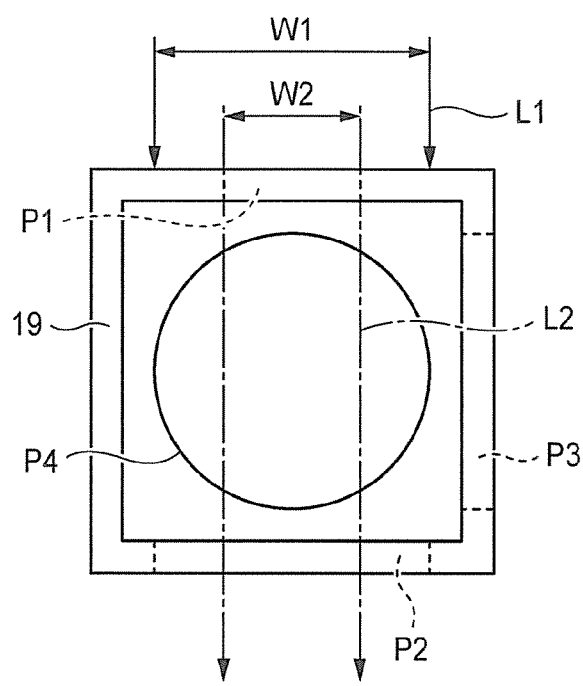
FIG. 6D is a schematic view illustrating a constitution of the sample container installation portion and illustrates a top view at the time of irradiation with excitation light.

In this constitution, when excitation light is incident in the direction of the port P1, a sample inside the sample container installation portion 19 is irradiated with excitation light within an irradiation range according to the shape and the position of the port P1. FIG. 6D is a top view of the sample container installation portion 19 illustrated regarding a horizontal length (width) of a light flux when the sample container installation portion 19 in this constitution is irradiated with excitation light. For example, when the sample container installation portion 19 is irradiated with excitation light L1 having a light flux corresponding to the length of a width W1, if the port P1 having a width W2 narrower than that of the excitation light L1 is provided, the width of excitation light L2 for irradiating a sample inside the sample container installation portion 19 becomes the width W2 of the port P1. At this time, a part of excitation light moves forward inside the sample and passes therethrough in the direction of the port P2. Since there is a possibility that excitation light moving forward inside a sample will be reflected by the inner wall of the sample container installation portion 19 and measurement of fluorescence will be affected, it is preferable that the size (width) of the port P2 be the same as that of the port P1 or larger than that of the port P1. Fluorescence emitted from a sample within an excitation light irradiation range designated in accordance with the port P1 passes through the port P3 and is guided to the fluorescence-side spectroscope 15, and a spectrum is measured.

Figure 6E:
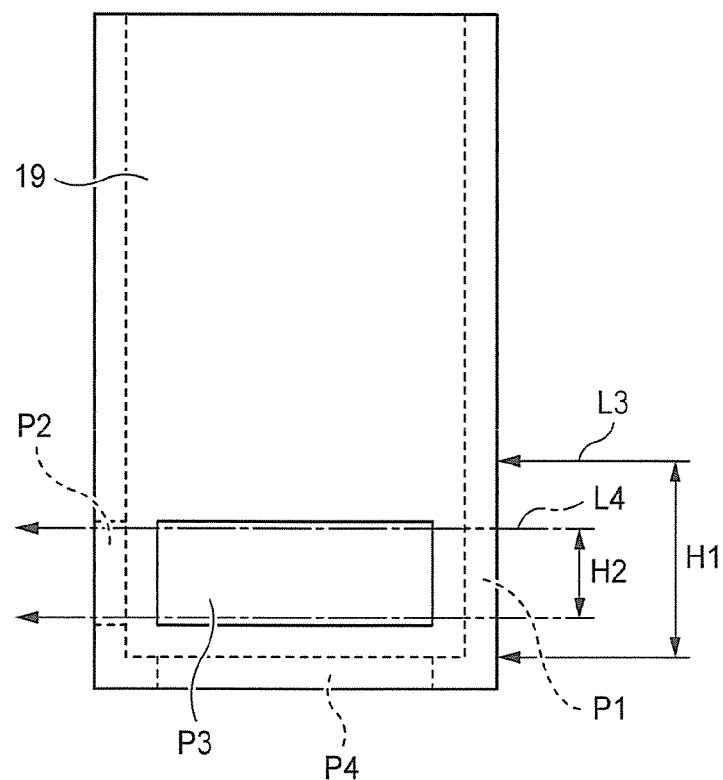
FIG. 6E is a schematic view illustrating a constitution of the sample container installation portion and illustrates a perspective view of another constitution.

FIG. 6E is a side view in the fluorescence taking-in direction of the sample container installation portion 19 illustrated regarding a vertical length (height) of a light flux when the sample container installation portion 19 in this constitution is irradiated with excitation light. In this constitution, when the sample container installation portion 19 is irradiated with excitation light L3 having a light flux corresponding to a vertical length H1, if the port P1 having a vertical length H2 shorter than the excitation light L3 is provided, the vertical length of excitation light L4 for irradiating a sample inside the sample container installation portion 19 becomes the vertical length H2 of the port P1. At this time, a part of excitation light moves forward inside the sample and passes therethrough in the direction of the port P2. Since there is a possibility that excitation light moving forward inside a sample will be reflected by the inner wall of the sample container installation portion 19 and measurement of fluorescence will be affected, it is preferable that the size (vertical length) of the port P2 be the same as that of the port P1 or larger than that of the port P1. Fluorescence emitted from a sample passes through the port P3 and is guided to the fluorescence-side spectroscope 15, and a spectrum is measured. At this time, fluorescence emitted from the sample is emitted within a range in which the sample is irradiated with excitation light. In order to increase the quantity of fluorescence guided to the fluorescence-side spectroscope 15, it is desirable that the position and the size of the port P3 correspond to an excitation light irradiation range designated in accordance with the position of the port P1. That is, it is preferable that the position and the size of the port P3 coincide with those of the excitation light L4.

Since the square cell-like sample container 5 used in a spectrofluorophotometer has a transparent bottom surface portion, fluorescence emitted from a sample passes through the port P4 and is guided to the camera module 20, and an image of the sample is captured. If the sample container 5 having a flat and transparent bottom surface is installed in the sample container installation portion 19, the camera module 20 observes a flat surface, and thus a vivid image can be obtained.

That is, the sample container installation portion 19 has at least the port P1 in an excitation light incidence direction and the port P3 in a fluorescence emission direction. However, it also has the port P4 for the camera module 20 capturing a sample image in another direction. In the examples of FIGS. 6A to 6E, the port P4 is provided at a position in the bottom surface direction of the sample container installation portion 19, and the camera module 20 is also provided in the bottom surface direction of the sample container installation portion 19 and captures a sample image by directly capturing fluorescence emitted from the sample S.

Figure 6F:
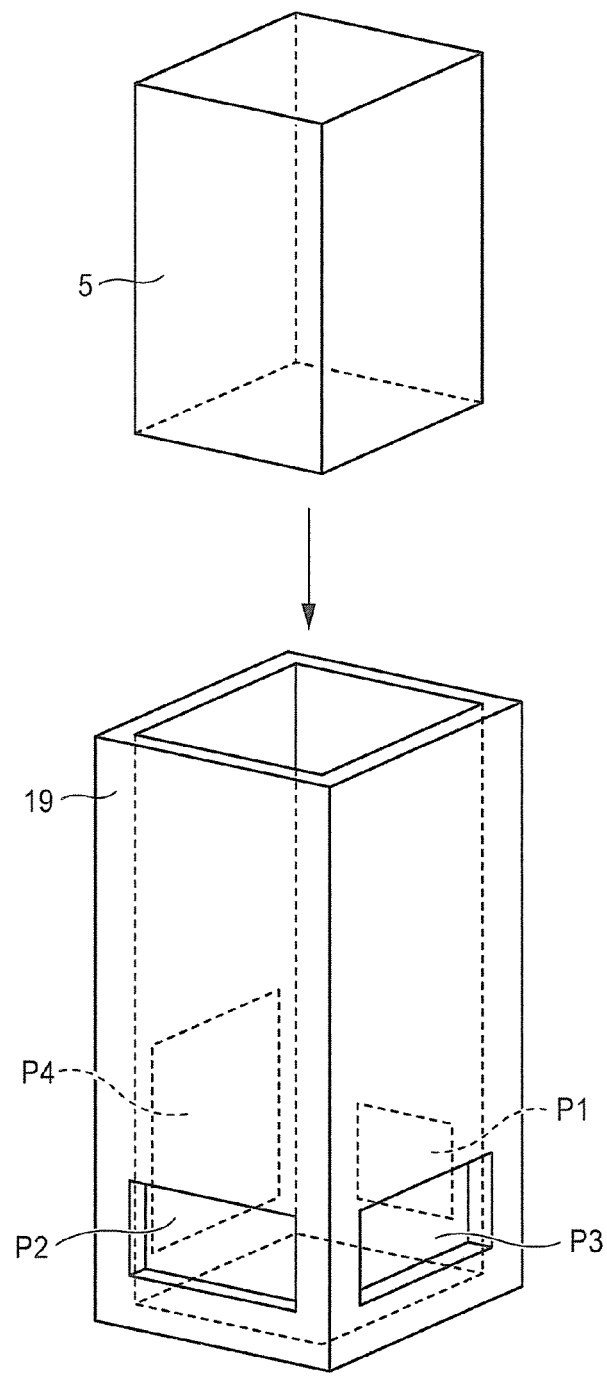
FIG. 6F illustrates an example of a case in which a port for capturing an image of a sample is provided at a lateral side portion of the sample container installation portion.

In the sample container installation portion 19, there is no need to restrict the shape and the dimension thereof, or the number, the shape, and the direction of ports as long as the condition that the fluorescence taking-in direction or the direction of the camera module 20 is not affected by excitation light moving forward inside a sample is satisfied. For example, FIG. 6F illustrates an example of a case in which the port P4 for capturing an image of a sample is provided in a lateral side portion of the sample container installation portion 19. In this case, the port P4 is provided at a position facing the port P3, and the square cell-like sample container 5 is observed from the side surface. That is, the port P4 is provided at a position in a side surface direction of the sample container installation portion 19, and the camera module 20 is also provided in the side surface direction of the sample container installation portion 19 and captures a sample image by directly capturing fluorescence emitted from the sample S.

In this constitution, the camera module 20 is constituted of a lens focused within the excitation light irradiation range, a diaphragm for adjusting the quantity of light, a long-pass filter for blocking unnecessary light, an image capturing element, and the like. The camera module 20 is controlled by the computer 31 of the data processing portion 30.

Figure 7A:
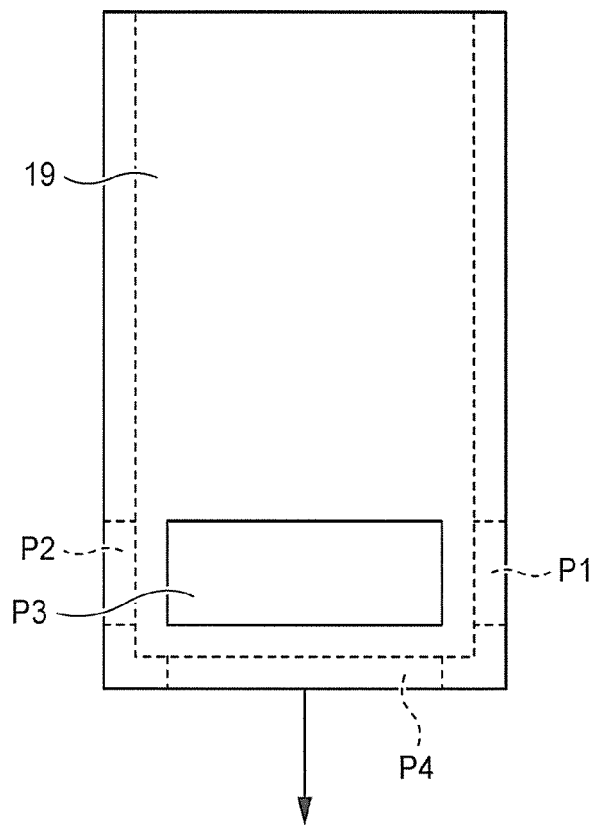
FIG. 7A is a view illustrating a constitution of the sample container installation portion and a camera module and illustrates a constitution in which the camera module directly observes the sample container installation portion.
Figure 7A:
Figure 7B:
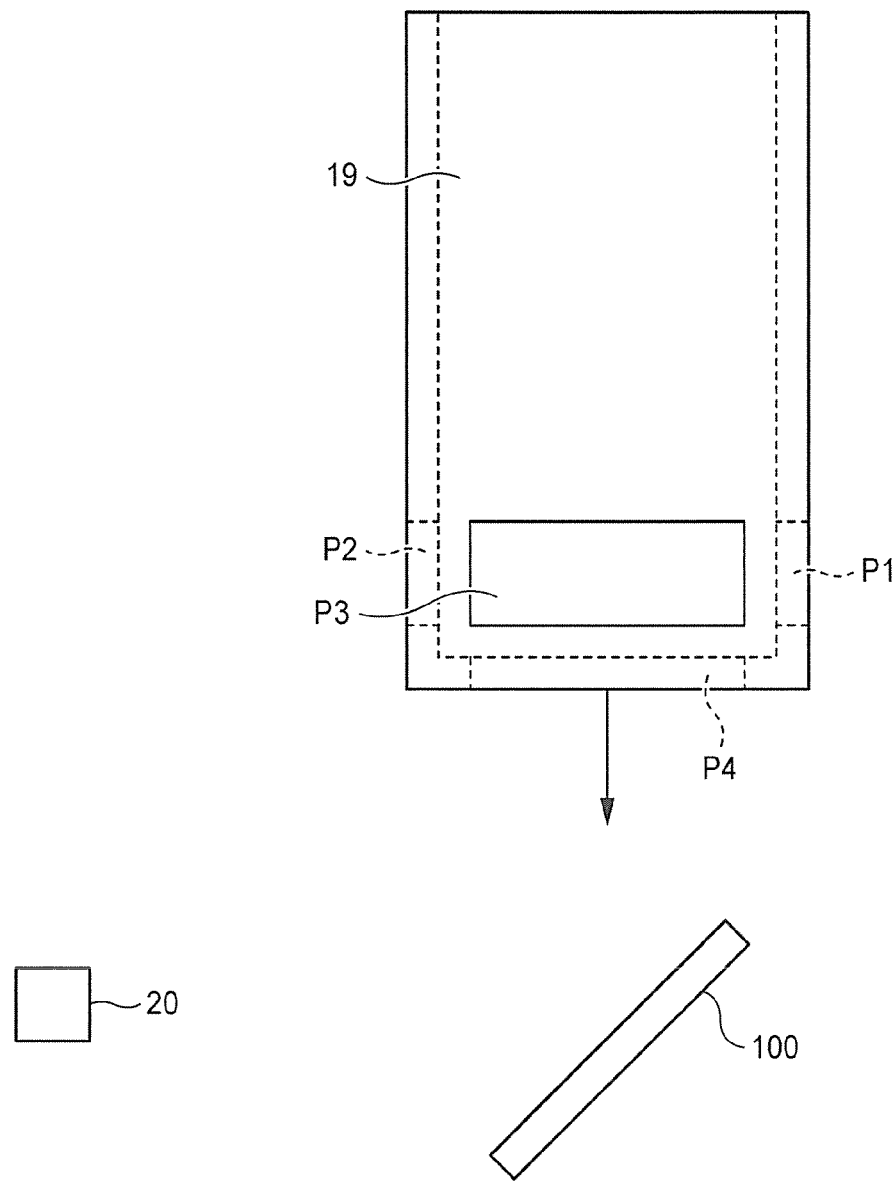
FIG. 7B is a view illustrating a constitution of the sample container installation portion and the camera module and illustrates a constitution in which the camera module indirectly observes the sample container installation portion via a mirror.

FIGS. 7A and 7B are views illustrated as side views in the fluorescence taking-in direction of the sample container installation portion 19 regarding a constitution of the sample container installation portion 19 and the camera module 20 for observing a sample container and a sample inside the sample container installation portion 19. FIG. 7A is a view illustrated regarding a constitution in which the camera module 20 directly observes the bottom surface portion of the sample container installation portion 19 via the port P4, and FIG. 7B is illustrated regarding a constitution in which the camera module 20 observes the bottom surface portion of the sample container installation portion 19 via the port P4 and a mirror 100. In order to capture an image, it is desirable that the mirror 100 be constituted of a material such as aluminum having a mirror surface and a high reflectance (as a guide, 80% or higher in reflectance).

According to an observation method of observing a sample using the spectrofluorophotometer 1 of the present invention, while the wavelength of excitation light is continuously varied by the excitation-side spectroscope 12, acquisition of an image of a sample and acquisition of a fluorescence spectrum can be performed at the same time. That is, while excitation light is not intermittent and the excitation light is continuously varied, a directly captured image of a sample can also be acquired, and thus precision observation can be performed.

Figure 8A:
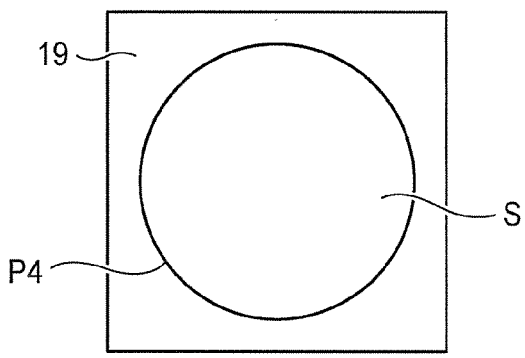
FIG. 8A is a view illustrating an example of an image and a spectrum of a sample and illustrates an image at the time of irradiation with white light.
Figure 8B:
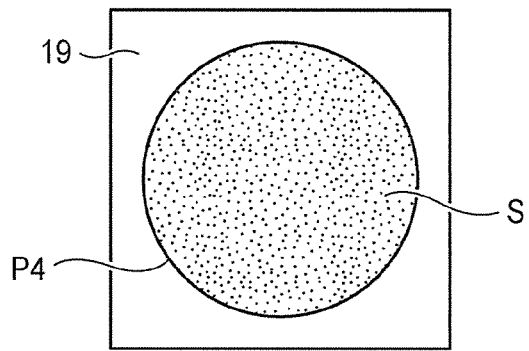
FIG. 8B is a view illustrating an example of an image and a spectrum of the sample and illustrates an image at the time of irradiation with monochromatic light having an arbitrary wavelength.
Figure 8C:
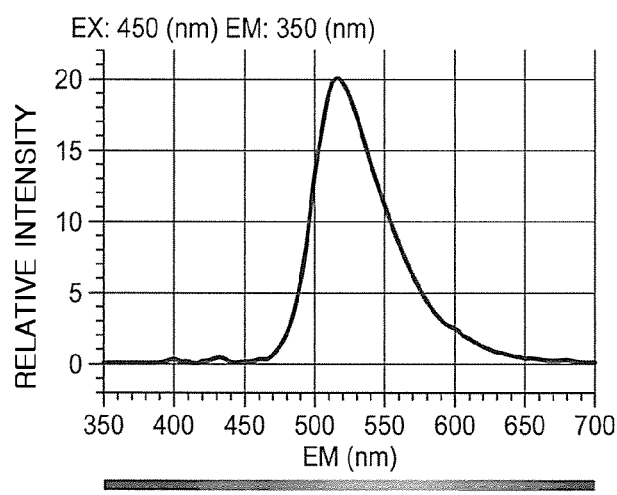
FIG. 8C is a view illustrating an example of an image and a spectrum of the sample and illustrates a fluorescence spectrum at the time of irradiation with the monochromatic light.

FIGS. 8A to 8C illustrate examples of images captured by the camera module 20 and a measured fluorescence spectrum via the port P4 from the bottom surface portion of the sample container installation portion 19 in measurement of the sample S inside the sample container 5. The sample S can be irradiated with white light which is not spectrally dispersed by causing irradiation light from the excitation-side spectroscope 12 to be a so-called 0-order light (excitation wavelength EX=0 nm). FIG. 8A illustrates an image captured when the sample S is irradiated with white light. On the other hand, FIG. 8B illustrates an image captured when the excitation-side spectroscope 12 is adjusted for irradiation with monochromatic light having an arbitrary wavelength (450 nm in FIGS. 8B and 8C, the excitation wavelength EX=450 nm) and the sample S is irradiated with the foregoing monochromatic light. In an obtained image, since a part corresponding to the bottom surface portion of the sample container installation portion 19 (the bottom surface excluding the port P4) is shielded from light, it appears black. Since light can be transmitted through the port P4 provided in the bottom surface portion of the sample container installation portion 19, it is possible to observe a situation when the sample S received inside the sample container is irradiated with white light or monochromatic light having an arbitrary wavelength. The fluorescence spectrum illustrated in FIG. 8C can be obtained by measuring fluorescence emitted from the sample S and detecting a distribution of the intensity of fluorescence of each wavelength corresponding to monochromatic light. In the fluorescence spectrum of FIG. 8C, the horizontal axis expresses a fluorescence wavelength EM (nm). At this time, an image of the sample S (FIG. 8B) captured by the camera module 20 at the same time as observation of fluorescence becomes an image based on fluorescence emitted from the sample S.

Figure 9A:
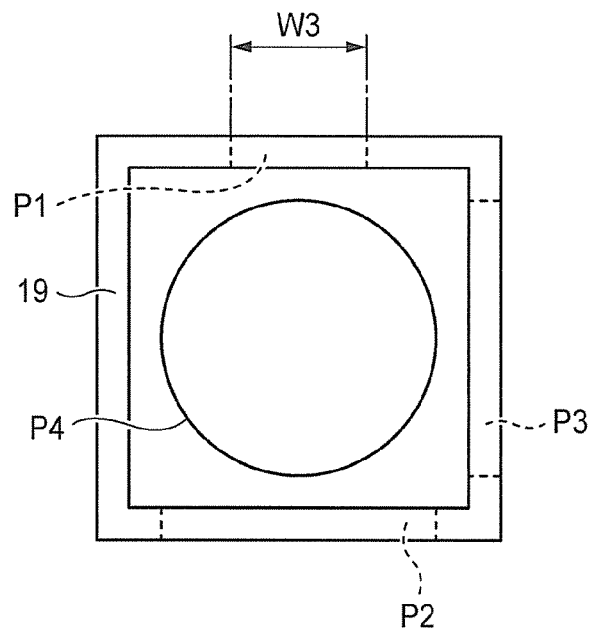
FIG. 9A is a view illustrating an example of a constitution of the sample container installation portion at the time of irradiation with excitation light and an image captured at that time and illustrates a top view of the sample container installation portion.
Figure 9B:
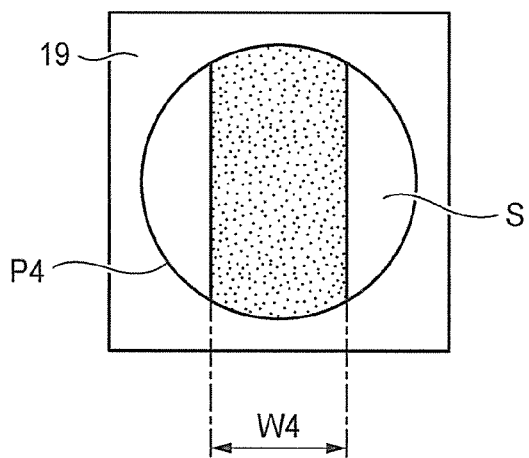
FIG. 9B is a view illustrating an example of a constitution of the sample container installation portion at the time of irradiation with excitation light and an image captured at that time and illustrates an image captured in a bottom surface direction of the sample container installation portion.

Since an image observed by the camera module 20 varies depending on the shape of white light for irradiating the sample S and excitation light designated in accordance with the port P1, an image is captured by varying the shape of the port P1 of the sample container installation portion 19 in accordance with the purpose. FIG. 9A illustrates a top view when irradiation is performed with excitation light in the direction of the port P1 having a width W3 regarding the sample container installation portion 19, and FIG. 9B illustrates an image captured by the camera module 20 through the port P4 in the bottom surface direction of the sample container installation portion 19 at that time (that is, the embodiments in FIGS. 6A to 6E). The width of excitation light for irradiating the sample S is determined depending on the width W3 of the port P1. Since fluorescence emitted from the sample S is emitted within a range in which irradiation is performed with excitation light, an obtained image becomes an image in which fluorescence is emitted from the sample S within a range of a width W4 that is the same as the width W3 of the port P1.

Figure 9C:
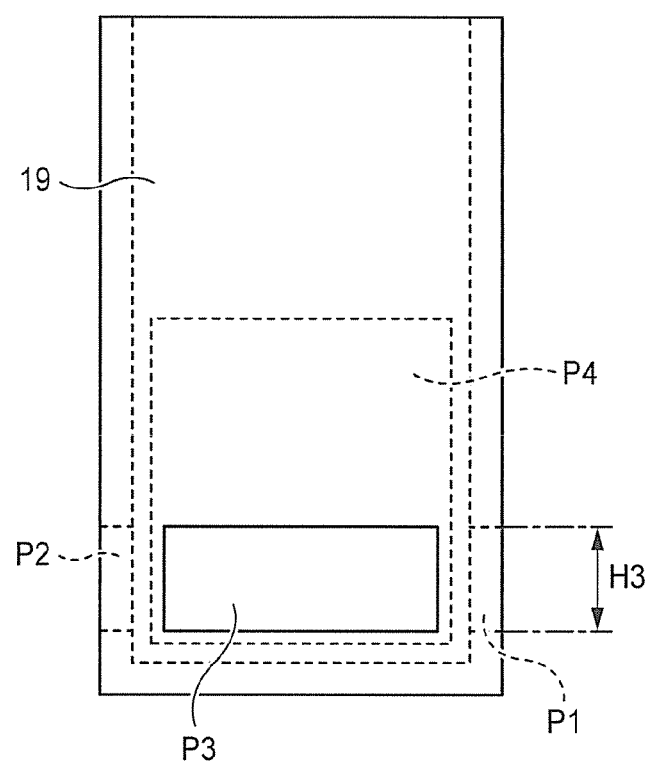
FIG. 9C is a view illustrating an example of a constitution of the sample container installation portion at the time of irradiation with excitation light and an image captured at that time and illustrates a side view in a fluorescence taking-in direction of the sample container installation portion.
Figure 9D:
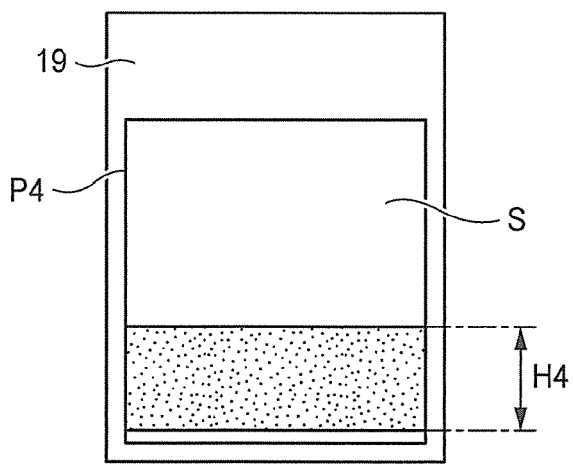
FIG. 9D is a view illustrating an example of a constitution of the sample container installation portion at the time of irradiation with excitation light and an image captured at that time and illustrates an image captured in a side surface direction of the sample container installation portion.

FIG. 9C illustrates a side view in the fluorescence taking-in direction when irradiation is performed with excitation light in the direction of the port P1 having a vertical length H3 regarding the sample container installation portion 19, and FIG. 9D illustrates an image captured by the camera module 20 through the port P4 on the side surface facing the fluorescence taking-in direction of the sample container installation portion 19 at that time (that is, the embodiment in FIG. 6F). Since fluorescence emitted from the sample S is emitted within a range in which irradiation is performed with excitation light, an obtained image becomes an image in which fluorescence is emitted from the sample S within a range of a vertical length H4 that is the same as the vertical length H3 of the port P1.

In FIGS. 9B and 9D, the width of emitted fluorescence is expressed by a straight line. However, since fluorescence emitted from the sample S is emitted in all directions, an image which is actually obtained becomes an image in which a blur has occurred to an outward side of the width or the vertical length.

FIGS. 9A to 9D illustrate that the width W3 (width W4) and the vertical length H3 (vertical length H4) are adjusted, and this indicates that the sizes thereof can be adjusted in accordance with the amount of the sample S (size of the sample container 5). For example, when the sample S is a precious substance, and the amount of use thereof (size of the sample container 5) is limited, appropriate measurement can be performed by using the sample container installation portion 19 having smaller width W3 and vertical length H3. In addition, regarding FIGS. 9C and 9D, for example, when the sample S is formed of a material which can be subjected to phase separation due to reaction, the sample S is subjected to phase separation into two layers, for example, by causing reaction in the sample container 5. However, when only the material of a part in the undermost layer corresponds to the vertical length H4, measurement of only the material of a part in the undermost layer can be performed. Various sample container installation portions 19 in which the width W3 and the vertical length H3 are varied to various values can be prepared in advance.

Figure 10:
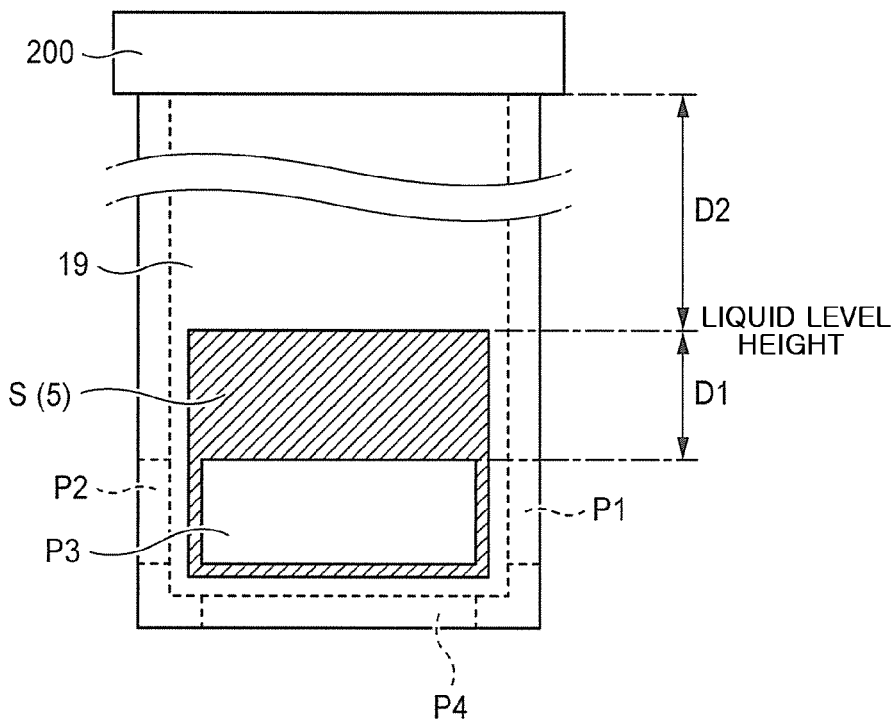
FIG. 10 is a view illustrating a white board installed in the sample container installation portion.

FIG. 10 is a side view in the fluorescence taking-in direction illustrating a constitution in which a white board 200 is installed in an upper portion of the sample container installation portion 19 (that is, the embodiments in FIGS. 6A to 6E) when observation is performed in the bottom surface direction of the sample container installation portion 19. The white board 200 is installed in the upper portion of the sample container installation portion 19, and a flat surface thereof faces the port P4 of the bottom surface portion of the sample container installation portion 19. The white board 200 is constituted of a white material such as aluminum oxide or a fluororesin-based white plate having a high reflectance, or the outer surface is coated with the white material. There is no need for the white board 200 in its entirety to be constituted of a white material such as a case in which a white material is applied on only one flat surface of the white board 200.

A part of fluorescence emitted from the sample S is reflected by the white board 200 installed in the upper portion of the sample container installation portion 19, passes through the sample S, and is taken into the camera module 20. Therefore, compared to a case in which the white board 200 is not installed, a brightness value of a captured image can be improved. When this constitution is applied, in order to prevent fluorescence emitted from the sample S from being absorbed by the sample S itself and being attenuated, it is preferable that a distance D1 from a range in which fluorescence is emitted to a liquid level height be short as much as possible. In addition, since a great part of fluorescence emitted from a sample arrives at the white board, it is preferable that a distance D2 from the liquid level height of the sample S to the white board 200 be short as much as possible.

Figure 11:
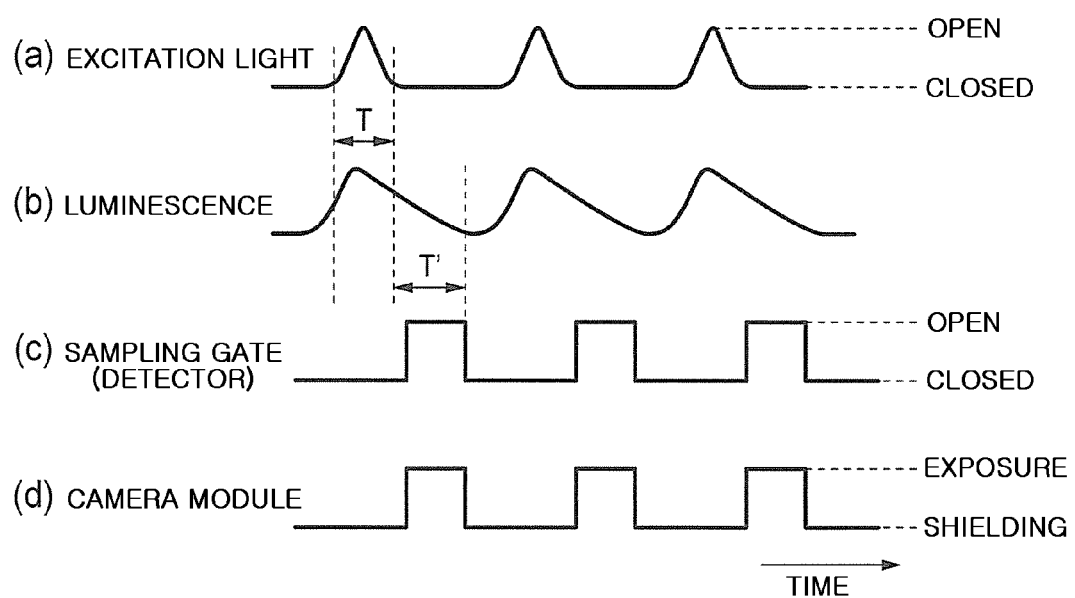
FIG. 11 is a view illustrating a timing chart at the time of measurement of phosphorescence.

Next, a method of capturing an image of a sample utilizing the spectrofluorophotometer 1 will be described. A general spectrofluorophotometer can measure phosphorescence. Measurement of phosphorescence is a technique, in which only phosphorescence is measured after excitation light for irradiating a sample is temporarily blocked, utilizing that the duration of life of phosphorescence is longer than that of fluorescence. FIG. 11 is a view illustrating an example of a timing chart of measurement in image capturing by the spectrofluorophotometer 1 of the present embodiment. In this control, the photometer portion 10, particularly, the computer 31 thereof controls an operation timing of the excitation-side spectroscope 12, the detector 16, and the camera module 20.

First, the computer 31 controls the excitation-side spectroscope 12, and the sample S is irradiated with excitation light from the light source 11 in a pulse shape having arbitrary time intervals (FIG. 11(a)). During a time T immediately after irradiation is performed with excitation light, the sample S emits both fluorescence and phosphorescence, but only the phosphorescence having a longer duration of life is emitted during a time T' after the excitation light is blocked (FIG. 11(b)). The computer 31 controls the detector 16 in accordance with the timing of the time T', and a time zone (sampling gate) for detecting light is associated. Thus only the phosphorescence can be measured (FIG. 11(c)). At this time, the computer 31 causes an exposure timing of the camera module 20 and the detector 16 to be synchronized with each other (FIG. 11(d)), thereby being able to perform measurement of a spectrum of the sample S emitting phosphorescence and image capturing of a sample image at the same time.

According to the method described above, phosphorescence emitted from the sample S can be measured, and an image of a sample of phosphorescence can be captured. At a normal time, a substance having phosphorescence is recognized by the naked eyes of a human due to mixed light of fluorescence and phosphorescence. However, fluorescence and phosphorescence can be separately evaluated by measurement of phosphorescence as described above. In measurement of a spectrofluorophotometer in the related art, phosphorescence is recognized in only a form of a spectrum. However, color information and the like can be directly acquired by obtaining an image of phosphorescence, and further detailed information can be obtained regarding a sample.

Regarding an example of use of a spectrofluorophotometer, there is a method of stirring a sample after a particular reagent is dropped into the sample inside the sample container 5 and measuring change over time of a spectrum. In the spectrofluorophotometer 1 of in the present embodiment, in addition to change over time in fluorescence, change over time in an image in a luminescent state can also be observed. Generally, a stirring bar is often used for stirring of a sample, and this makes observation of the sample difficult. According to the spectrofluorophotometer 1 of the present embodiment, the sample S is observed and an image thereof is captured through the port P4 in another direction, or observation can be performed by adopting other methods such as ultrasound irradiation from the surroundings for stirring the sample S.

The present invention is not limited to the embodiment described above and can be suitably subjected to modifications, improvement, and the like. Further, the material, the shape, the dimension, the numeric value, the form, the number, the disposition place, and the like of each constituent element in the embodiment described above are arbitrary and are not limited as long as the present invention can be achieved.

What is claimed is:

1. A spectrofluorophotometer comprising:
   a light source;
   an excitation-side spectroscope that performs spectral dispersion from light of the light source and generates excitation light;
   a fluorescence-side spectroscope that performs spectral dispersion of fluorescence emitted from a sample irradiated with the excitation light into monochromatic light;
   a sample container installation portion for holding a sample container which receives a liquid sample and is formed of a transparent material;
   a detector that detects fluorescence emitted from the liquid sample; and
   an image capturing device that captures a sample image of the liquid sample emitting fluorescence,
   wherein the sample container installation portion has ports in an excitation light incidence direction for transmitting the excitation light to the sample in the excitation light incidence direction and a fluorescence emission direction and further has a port in another direction for the image capturing device to capture the sample image and a port which is provided on a surface facing the port in the excitation light incidence direction and transmits excitation light that has been transmitted through the sample in a linear direction to outside.

2. The spectrofluorophotometer according to claim 1,
   wherein the image capturing device is provided at a position in a bottom surface direction of the sample container installation portion, and
   wherein the image capturing device captures the sample image by directly capturing fluorescence emitted from the sample in the bottom surface direction of the sample container installation portion.

3. The spectrofluorophotometer according to claim 1,
   wherein the image capturing device is provided at a position in a side surface direction of the sample container installation portion, and
   wherein the image capturing device captures the sample image by directly capturing fluorescence emitted from the sample in the side surface direction of the sample container installation portion.

4. A spectrofluoro-measurement method using a spectrofluorophotometer comprising
   a light source,
   an excitation-side spectroscope that performs spectral dispersion from light of the light source and generates excitation light,
   a fluorescence-side spectroscope that performs spectral dispersion of fluorescence emitted from a sample irradiated with the excitation light into monochromatic light,
   a sample container installation portion for holding a sample container which receives a liquid sample and is formed of a transparent material,
   a detector that detects fluorescence emitted from the liquid sample, and
   an image capturing device that captures a sample image of the liquid sample emitting fluorescence,
   the spectrofluoro-measurement method comprising:
      causing excitation light to be directly incident in an excitation light incidence direction through a port provided in the excitation light incidence direction of the sample container installation portion;
      causing excitation light that has been transmitted through the sample in a linear direction to be transmitted through a port provided on a surface facing the port in the excitation light incidence direction to outside;

causing the detector to detect fluorescence through a port provided in a fluorescence emission direction of the sample container installation portion; and causing the image capturing device to capture the sample image via a port provided in another direction of the sample container installation portion.

5. An image capturing method using a spectrofluorophotometer comprising:

irradiating a sample with excitation light;

blocking excitation light after fluorescence and phosphorescence are emitted from the sample;

detecting only phosphorescence emitted from the sample after excitation light is blocked; and capturing a sample image in synchronization with a detection timing of phosphorescence.

* * * * *